(12) United States Patent
Armijo et al.

(10) Patent No.: US 11,460,344 B2
(45) Date of Patent: Oct. 4, 2022

(54) MODULAR LOW COST TRACKERLESS SPECTRAL SENSOR

(71) Applicant: National Technology & Engineering Solutions of Sandia, LLC, Albuquerque, NM (US)

(72) Inventors: Kenneth M. Armijo, Albuquerque, NM (US); Julius Yellowhair, Albuquerque, NM (US); Richard K. Harrison, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/936,553

(22) Filed: Jul. 23, 2020

(65) Prior Publication Data

US 2020/0355556 A1 Nov. 12, 2020

Related U.S. Application Data

(62) Division of application No. 15/834,964, filed on Dec. 7, 2017, now Pat. No. 10,760,972.

(51) Int. Cl.
*G01J 3/51* (2006.01)
*G01J 3/02* (2006.01)
*G01J 3/12* (2006.01)

(52) U.S. Cl.
CPC .............. *G01J 3/51* (2013.01); *G01J 3/021* (2013.01); *G01J 3/0202* (2013.01); *G01J 3/0208* (2013.01); *G01J 2003/1221* (2013.01)

(58) Field of Classification Search
CPC .......... G01J 3/51; G01J 3/0202; G01J 3/0208; G01J 3/021; G01J 2003/1221; G01J 1/4204; G01J 3/36; G01J 2003/1213; G01J 3/0262; G01J 3/0205; G01J 3/0235; G01J 3/18; G01J 3/2803; G01J 3/32
See application file for complete search history.

(56) References Cited

U.S. PATENT DOCUMENTS 8,233,148 B2 * 7/2012 Bodkin ................. G01J 3/0256
356/328
2002/0163641 A1 11/2002 Shroder

FOREIGN PATENT DOCUMENTS

GB        1506294        4/1978

OTHER PUBLICATIONS

Chan, N. L. A. et al., "Quantifying the Impact of Individual Atmospheric Parameters on CPV System Power and Energy Yield," Photovoltaic Specialists Conference (PVSC), 2012 38th IEEE, 000922-000927, IEEE (2012), 6 pages.

(Continued)

*Primary Examiner* — Tony Ko
(74) *Attorney, Agent, or Firm* — Daniel J. Jenkins (57) ABSTRACT

A non-tracking solar sensor device and systems. The non-tracking solar sensor system includes a transparent hemispherical dome enclosure for receiving light. A diffuser is disposed with the enclosure for diffusing the light. A photodiode sensor array senses at least one discrete wavelength of the diffused light. A data acquisition module is configured to receive a sensor signal from the sensor array, the signal indicative of light quality at least one discrete wave band for processing via a processor module.

4 Claims, 5 Drawing Sheets

(56) References Cited

OTHER PUBLICATIONS

Chan, N. L. A. et al., "Validation of energy prediction method for a concentrator photovoltaic module in Toyohashi Japan," Progress in Photovoltaics: Research and Applications (2013) 21:1598-1610.
Jaus, J. et al., "Generalized Spectral Performance Evaluation of Multijunction Solar Cells Using a Multicore, Parallelized Version of SMARTS," AIP Conference Proceedings (2012) 1477, pp. 122-126.
Chan, N. et al., "Variation in Spectral Irradiance and the Consequences for Multi-Junction Concentrator Photovoltaic Systems," Photovoltaic Specialists Conference (PVSC); 2010 35th IEEE; 003008-003012; IEEE (2010), 5 pages.
Muller, M. et al., "An Investigation into Spectral Parameters as they Impact CPV Module Performance," AIP Conference Proceedings (2010) 1277, pp. 307-311.
Gueymard, C. A., "Daily spectral effects on concentrating PV solar cells as affected by realistic aerosol optical depth and other atmospheric conditions," SPIE Conf. #7410, Optical Modeling and Measurements for Solar Energy Systems III (2009), San Diego, CA, International Society for Optics and Photonics, 14 pages.
Minemoto, T. et al., "Impact of spectral irradiance distribution and temperature on the outdoor performance of amorphous Si photovoltaic modules," Solar Energy Materials & Solar Cells (2007) 91:919-923.
Gottschalg, R., et al., "The effect of spectral variations on the performance parameters of single and double junction amorphous silicon solar cells," Solar Energy Materials & Solar Cells (2005) 85:415-428.
Gottschalg, R. et al., "Experimental study of variations of the solar spectrum of relevance to thin film solar cells," Solar Energy Materials & Solar Cells (2003) 79:527-537.
Gonzalez, M. et al., "Solar Cells Efficiency Variations with Varying Atmospheric Conditions," Solar Energy (1994) 53(5):395-402.
King, R. R. et al., "Solar cell generations over 40% efficiency," Progress in Photovoltaics: Research and Applications (2012) 20:801-815.
ASTM International; G173-03 Standard Tables for Reference Solar Spectral Irradiances: Direct Normal and Hemispherical on 37° Tilted Surface (2012) 20 pages.
McMahon, W. E. et al., "Criteria for the Design of GaInP/GaAs/Ge Triple-Junction Cells to Optimize their Performance Outdoors," National Renewable Energy Laboratory (2002) pp. 931-934.
Al Taher, O. et al., "Qualification Testing of 40% Metamorphic CPV Solar Cells," Photovoltaic Specialists Conference (PVSC); 2010 35th IEEE; pp. 1995-1998; IEEE.
Gueymard, C. A., SMARTS2, A Simple Model of the Atmospheric Radiative Transfer of Sunshine: Algorithms and performance assessment (1995) Florida Solar Energy Center/University of Central Florida, Cocoa, Florida, 84 pages.
Gueymard, C. A., "Parameterized Transmittance Model for Direct Beam and Circumsolar Spectral Irradiance," Solar Energy (2001) 71(5):325-346.
Holben, B. N. et al., "AERONET—A Federated Instrument Network and Data Archive for Aerosol Characterization," Remote Sensing of Environment (1998) 66(1):1-16.
Holben, B. N. et al., "An emerging ground-based aerosol climatology: Aerosol optical depth from AERONET," Journal of Geophysical Research (2001) 106(D11):12067-12097.
Seckmeyer, G. et al., "Instruments to Measure Solar Ultraviolet Radiation, Part 3: Multi-channel filter instruments," World Meteorological Organization Global Atmosphere Watch (Nov. 2010), Geneva, Switzerland, 57 pages.
Reda, I. et al., "Solar Position Algorithm for Solar Radiation Applications," National Renewable Energy Laboratory (2008) NREL/TP-560-34302, Golden, Colorado, 40 pages.
Gueymard, C. A., "SMARTS code, version 2.9.5, for Windows, User's Manual," Solar Consulting Services (2005), 50 pages.
Ångström, A., "On the Atmospheric Transmission of Sun Radiation and on Dust in the Air," Geografiska Annaler (1929) 11:156-166.
Jacobson, M. Z., Fundamentals of Atmospheric Modeling, Second Edition (2005) Cambridge University Press, New York, USA, 829 pages.
Gilbert, N. L. et al., "Assessing Spatial Variability of Ambient Nitrogen Dioxide in Montreal, Canada, with a Land-Use Regression Model," Journal of the Air & Waste Management Association (2005) 55(8):1059-1063.
Bucholtz, A., "Rayleigh-scattering calculations for the terrestrial atmosphere," Applied Optics (1995) 34(15):2765-2773.
Bodhaine, B. A. et al., "On Rayleigh Optical Depth Calculations," Journal of Atmospheric and Oceanic Technology (1999) 16:1854-1861.
Armijo, K. M. et al., "Spectral Derates Phenomena of Atmospheric Components on Multi-Junction CPV Technologies," 10th International Conference on Concentrator Photovoltaic Systems (2014) 1616, pp. 264-271.

* cited by examiner

MODULAR LOW COST TRACKERLESS SPECTRAL SENSOR

CROSS-REFERENCE TO RELATED APPLICATIONS

This is a divisional application of U.S. application Ser. No. 15/834,964, entitled "MODULAR LOW COST TRACKERLESS SPECTRAL SENSOR," filed Dec. 7, 2017, which is incorporated herein by reference in its entirety.

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to spectral sensors for solar irradiance. The application relates more specifically to a fixed position spectral sensor for solar radiation, atmospheric monitoring, sensing of atmospheric particulates and methods of spectral irradiance analysis for positioning photovoltaic (PV) arrays.

Current photovoltaic (PV) installations require large financial investments. To get an improved positive return on the investment, PV technology must be better matched to the solar spectral resource at a solar power generating location. Improved matching of the solar spectral resource requires extended monitoring of the solar spectrum using a spectrometer. Solar spectrometers may be expensive and difficult to implement in practice. Tracking systems that tilt or reposition the spectral sensors require complex mechanical systems and may introduce error in the data when the positioning systems wear over time.

Site-specific solar spectrum needs to be considered to most effectively utilize the solar resources at a given location. Decisions can then be made on the appropriate solar technology to optimize power generation. The rise of commercially relevant non-silicon thin film PV materials such as copper indium gallium selenide (CIGS) and cadmium telluride (CdTe) provides different bandgaps that can be employed for local spectra that can be red- or blue-shifted from the Standard Tables for Reference Solar Spectral Irradiances published in ASTM G173 standard.

Furthermore, spectral ratios that differ from the norm can influence the overall production in multi junction PV cells by changing the current limiting junction. Specific, geographically varying atmospheric components like water vapor and dust aerosols can affect the spectrum and must be accounted for when addressing variations in spectral ratios. After a suitable PV technology is selected for a site, the daily solar spectrum must monitored to accurately predict the performance of the PV system Spectrometer systems that are capable of delivering this information are often expensive, require maintenance, delicate, data intensive, and can be challenging to implement in the field. Various spectrometers are available on the market.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a photodiode sensor device. The photodiode sensor device includes a housing portion. The housing portion includes a cylindrical enclosure. A window is disposed at a first end of the housing portion. A filter wheel is within the housing portion. A motor positioned within the housing is adjacent the filter wheel opposite the window. The motor is attached to the filter wheel for rotating the filter wheel. A first photodiode sensor is located within the housing portion and positioned intermediate to the first photodiode sensor and the window. The first photodiode sensor arranged to receive filtered light incident on the window and transmit a signal associated with sensed parameters of the filtered light.

Another embodiment relates to a non-tracking solar sensor system. The non-tracking solar sensor system includes a transparent hemispherical dome enclosure for receiving light. A diffuser is disposed with the enclosure for diffusing the light. A photodiode sensor array senses at least one discrete wavelength of the diffused light. A data acquisition module is configured to receive a sensor signal from the sensor array, the signal indicative of light quality at least one discrete wave band for processing via a processor module.

Still another embodiment relates to a non-tracking solar sensor system. The non-tracking solar sensor system includes a transparent hemispherical light collection diffuser portion, a collimating lens disposed adjacent to the diffuser portion, a grating, a focusing lens, and a linear detector array; the diffuser portion having an exit port at one end configured to transmit a portion of light to a collimating lens; the grating disposed between the collimating lens and the focusing lens; the linear photodiode sensor array disposed adjacent to the focusing lens opposite the grating for receiving the diffused light and sensing parameters associated with the diffused light; the photodiode sensor array configured to transmit the sensed parameters to a data acquisition module.

Another embodiment of a non-tracking solar sensor system would be based on a convex reflective mirror, an optical collimation lens, and an array of optical sensors and filters. In this embodiment, the hemispherical mirror is placed at the bottom to direct light up into the detector array. Optical wavelength separation may be accomplished using dichroic mirrors may be placed to reflect certain portions of the solar spectrum while passing others. The ratios of signals between sensors may be used to describe the overall solar spectrum.

Non-tracking, or stationary, solar spectrum sensors are advantageous because most PV plants have the modules on a fixed angle or tilt, and most do not have access to two-axis trackers because two-axis tracking systems are generally expensive. This unique fixed position, or trackerless, design quality also offers potentially ubiquitous adoption in solar energy applications, as well as in as agriculture, health, weather forecasting and many others. In addition, the disclosed solar spectrum sensors require minimal operating power, and may also be connected to a tandem, inexpensive solar cell-battery assembly and data logger.

One more advantage of the disclosure is a novel, inexpensive spectral sensor suitable for outdoor use that accurately monitors the solar spectrum to optimize solar power generation and better predict PV performance.

Another advantage is the ability to operate the spectral sensor without the need for an expensive solar spectrum tracker to record accurate spectral irradiance measurements from any non-shaded location. Commercial-off-the-shelf items may be utilized.

Another advantage is software developed to process data for optimizing solar PV and thermal applications. The disclosed spectral sensor also has other applications such as ambient background measurement for optical detection techniques, weather and air quality measurements, visibility data for airports, spectral calibration for satellite imaging systems, and climate change research for accurate, ubiquitous adoption and monitoring.

Still another advantage is weather forecasting can also greatly be aided as it can help address radiative forcing impacts which directly affect the weather by airborne particulates such as pollution and dust.

Further, the disclosure may improve crop yields due to the impact of the quality of light at certain bands and spectral-light research management for enhanced foliage crop productions.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
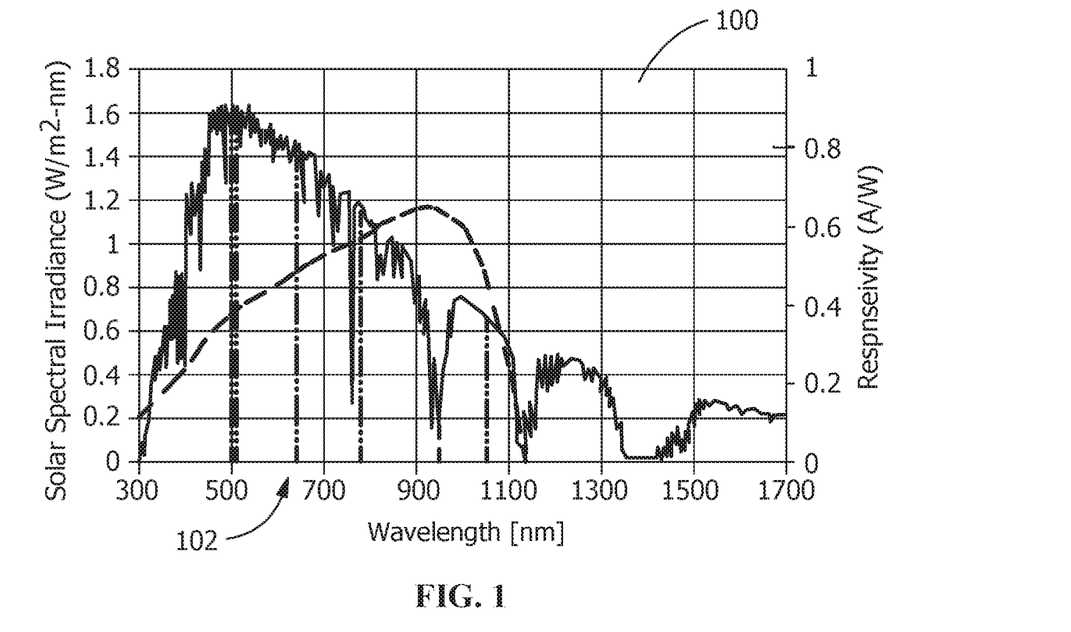
FIG. 1 is an exemplary solar spectral irradiance profile for a solar cell site.

Referring to FIG. 1, a typical solar spectral irradiance for Albuquerque, N. Mex. is shown. Responsivity of a silicon solar cell, and the possible discrete solar wavelengths that will be measured with the discrete spectral sensor are illustrated in FIG. 1. FIG. 1 shows an exemplary solar spectral irradiance 100, and the responsivity curve of a Silicon solar cell. The vertical lines represent the monitored discrete bands 102. The discrete spectral bands 102 are typically 10 nm wide, except for the band 102 at 500 nm which is 40 nm wide. A spectrometer measures the solar spectrum at a high resolution (1-2 nm). The spectrometer typically uses two different sensors. One sensor measures short wavelengths and another sensor measures longer wavelengths, or infrared radiation (IR). The disclosed system and methods apply a spectral sensor to measure sunlight at several discrete wavelengths, e.g., five or six discrete wavelengths. These discrete wavelengths are predetermined based on solar spectral analysis. Five discrete wavelengths are sufficient for full spectrum reconstruction. The solar spectral bands having the greatest relevance for the spectrometer are determined, e.g., based on aerosols, particulates, and precipitable water in the atmosphere. It should be noted that the disclosed embodiments may be modular and therefore are reconfigurable for selectively sensing solar irradiance in predetermined bands. By interchanging the modular photodiodes or filters the solar spectrometer can be tuned as desired to focus on wavelengths or bands of interest for the particular application.

In an embodiment, five measurements of the solar spectrum are suitable to accurately reconstruct a profile of the solar spectrum. In an exemplary embodiment the discrete wavelengths within the silicon (Si) responsivity curve may be limited. The wavebands may be extended into the infrared radiation band for other PV technologies or sensor applications.

The non-tracking spectral sensor eliminates the need for a two-axis tracker. A non-tracking sensor may be used in, e.g., PV plant facilities without access to two-axis trackers. With the modular versatility for a wide variety of spectral filters that can be utilized for analyzing discrete bands across the entire spectrum, as well as the utility of a fixed position sensor, a stationary spectral sensor may be implemented for a variety of locations and applications in many of atmospheric conditions.

Figure 2:
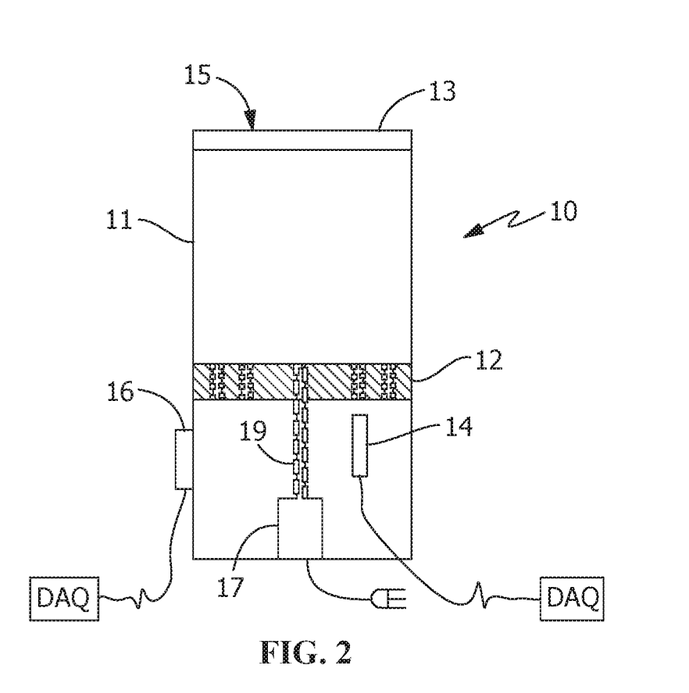
FIG. 2 shows an exemplary embodiment of a non-tracking spectral irradiance sensor including a filter wheel.

Referring to FIG. 2, an embodiment of a non-tracking spectral irradiance sensor 10 including a filter wheel is shown. Spectral irradiance sensor 10 may measure up to twelve bands using just one photodiode sensor module 10. A horizontally aligned filter wheel 12 is disposed within an opaque cylindrical enclosure or housing 11 open at an end 15 and having a transparent quartz window 13 covering the opening 15, for admitting solar irradiance. Filter wheel 12 is disposed above a photodiode sensor 14, e.g., a spectrum selective Si photodiode sensor. Sensor 14 collects data at predetermined intervals, e.g., every twenty seconds. In an embodiment a second sensor 16 may also be utilized, second sensor is not equipped with a filter wheel 12. Second sensor 16 monitors unfiltered, i.e., clear-sky irradiance measurements. If second sensor 16 does not detect clear-sky conditions, the sensor may transmit a signal to disable primary sensor 14, beneath filter wheel 12, to prevent it from operating, for ensuring the highest quality in data. Filter wheel 12 is linked mechanically to a motor 17 by a shaft 19, for rotating the position of wheel within enclosure 11.

Figure 3:
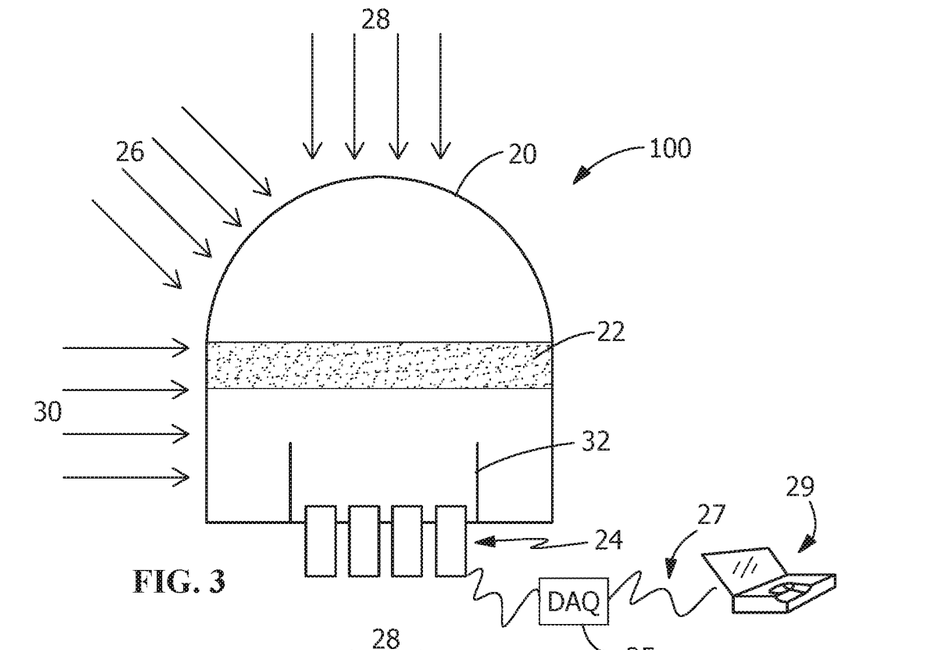
FIG. 3 shows an exemplary embodiment of a non-tracking solar sensor using the sensor of FIG. 2.

Referring next to FIG. 3 one embodiment for a non-tracking solar sensor is shown. A dome enclosure 20 is disposed above a diffuser 22 and a photodiode sensor array 24. The incident solar radiation indicated by arrows 26, 28, 30, is collected within dome enclosure 20. Inside dome enclosure 20 are diffusing elements 22 and baffles 32, which direct uniform solar radiation 26, 28, 30, to sensor array 24. Sensor array 24 includes multiple solar sensors 10 (FIG. 2) at the bottom of dome enclosure 20. Dome enclosure 20 is substantially transparent and collects and integrates the incident solar radiation. Sensors transmit analog signals to a data acquisition module 25. Data acquisition module 25 converts the analog signals to digital data and forwards, e.g., via data link 27, to a computer system, e.g., PC or server, for processing the digital data.

Figure 4:
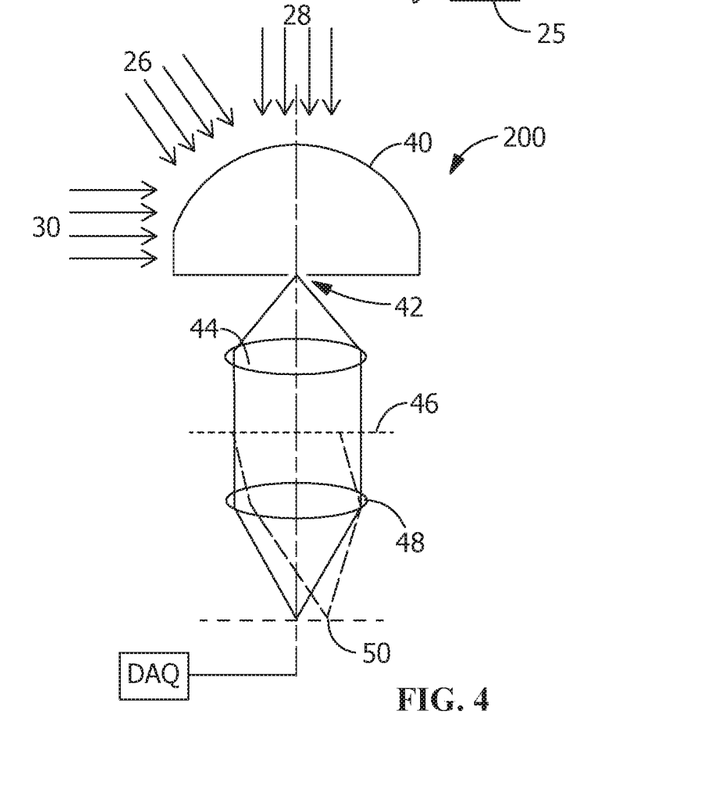
FIG. 4 shows an alternate exemplary embodiment of a non-tracking solar sensor with a custom collimating and focusing lens, using the sensors of FIG. 2.

Referring next to FIG. 4, an alternate embodiment for a non-tracking solar sensor is shown. Incident solar radiation 26, 28, 30 is collected with a custom lens 40. A small exit port 42 at the bottom of the lens directs a portion of solar radiation light 26-30 to a collimating lens 44. Light 26-30 is collected with lens 44 and then transmitted through a grating 46. Grating 46 disperses the light into different spectral orders. A focusing lens 48 is positioned below grating 46 to receive the dispersed light, and focuses the dispersed light on a linear detector array 50. Linear detector array 50 includes a plurality of sensors 10 (FIG. 2). Analog signals may transmitted and converted to digital data for processing, as described above with respect to FIG. 3.

Software is used to process the sensor data that is received by sensors 10. Sensor data is transmitted first to a data acquisition module 25 for conversion to digital formatted data for processing. Optimization algorithms are coupled with atmospheric modeling code and accurately reconstruct the solar spectrum. A regression analysis with interacting coefficients is used to predict, e.g., the PV short-circuit, directly from the sensor measurements. In an embodiment at least four wavelength bands may be used for correlation to the PV short-circuit current. The measurements over these wavebands may be used to verify the form of a short-circuit current profile.

In an exemplary embodiment a spectrum reconstruction method uses a spectral transmission model based on a condensed version of developed Sandia Spectral Transmission Model based on a condensed version of Equation 1 below:

$$I_{sc,Meas\ Temp.Corrected} = \frac{I_{sc,Meas}}{1 + \alpha_{Th}(T_{cell} - 25)} \quad \text{EQ. 1}$$

And the measured irradiance E is defined by Equation 2 below:

$$E = r^2 T E_0, \quad \text{EQ. 2}$$

where $E_0$ is the extraterrestrial irradiance at $AM_0$ measured above the earth's atmosphere, T is the total atmospheric transmittance affected by attenuation through the atmosphere, and r is the ratio of the average to actual sun to earth distance. In turn the atmospheric transmittance T can be estimated from the measured irradiance on the ground by Equation 3:

$$T = \frac{E}{r^2 E_0} \quad \text{EQ. 3}$$

since the extraterrestrial irradiance is fairly constant anywhere above the atmosphere.

Atmospheric attenuation may be caused by aerosols, ozone, gases, water vapor, and Rayleigh scattering. Each constituent affects different parts of the spectrum. By using the calibrated values of the photodiodes as well as the respective values of $E_0$, according to Equation 3 the respective transmission values are computed as indicated in as presented in FIG. 5 which shows a comparison graph (a) of the extraterrestrial spectral irradiance compared to the measured spectral irradiance at 11:40 am local time on Oct. 1, 2014 in Albuquerque, N. Mex., and the data from the calibrated spectral sensors, indicated by dots for the same day and time; and graph (b) shows a transmittance profile of the measured spectral irradiance shown in graph (a) and the corresponding calculated transmittance from the photodiode spectral sensors indicated by dots. Note that the $r^2$ factor was not taken into account in the calculation.

Figure 5:
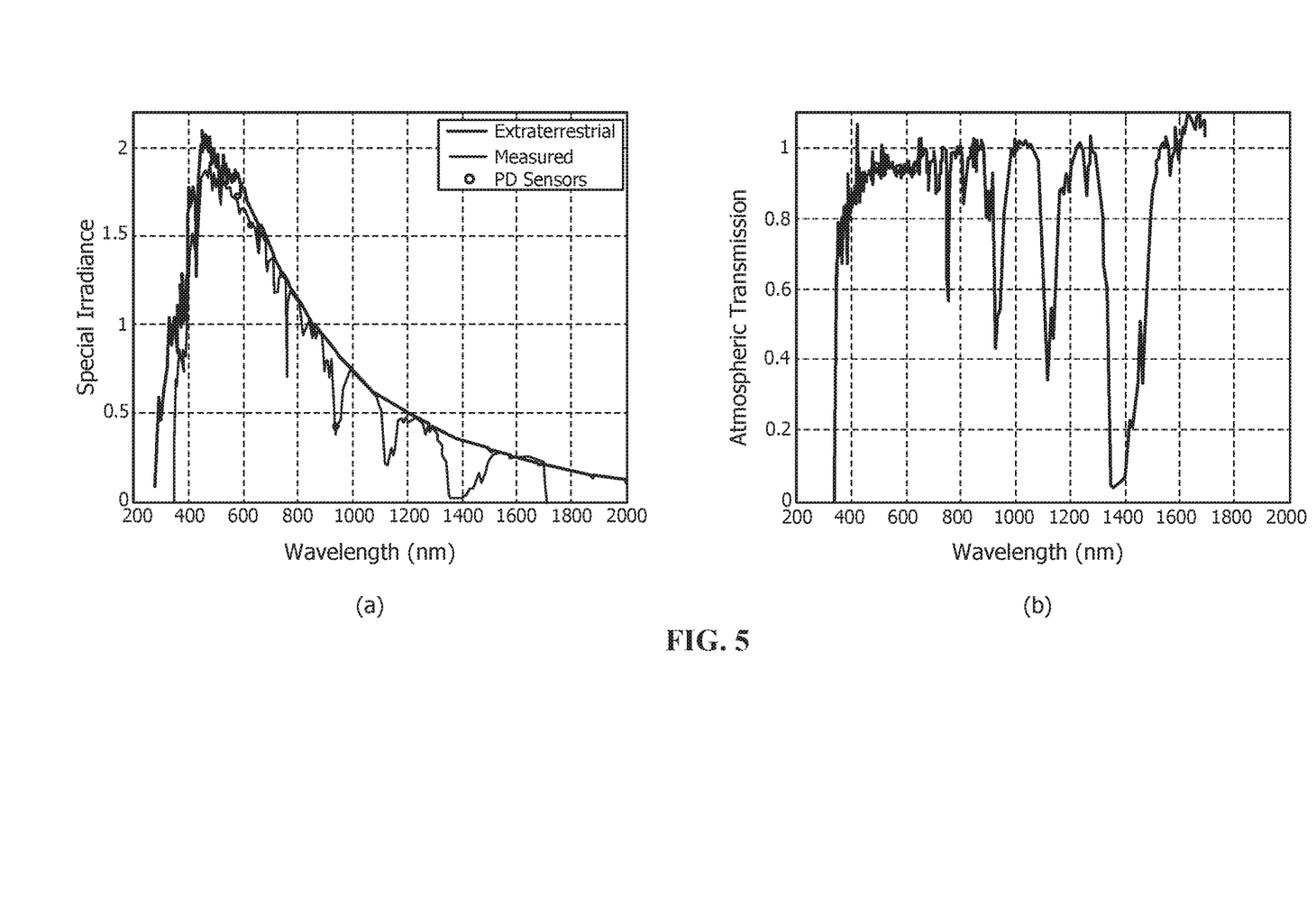
FIG. 5 shows a comparison graph of the extraterrestrial spectral irradiance a transmittance profile of the measured spectral irradiance.

Using this calibrated data of FIG. 5, each of these transmission points may be used to optimize and compute the spectrum according to their respective time series values. This functionality of the Spectral Transmission Model computes the spectrum based on fundamental atmospheric physics. After the optimization algorithm is complete the spectrum may be calculated and compared to the spectral irradiance measured by the wide-band EKO spectrometers.

Figure 6:
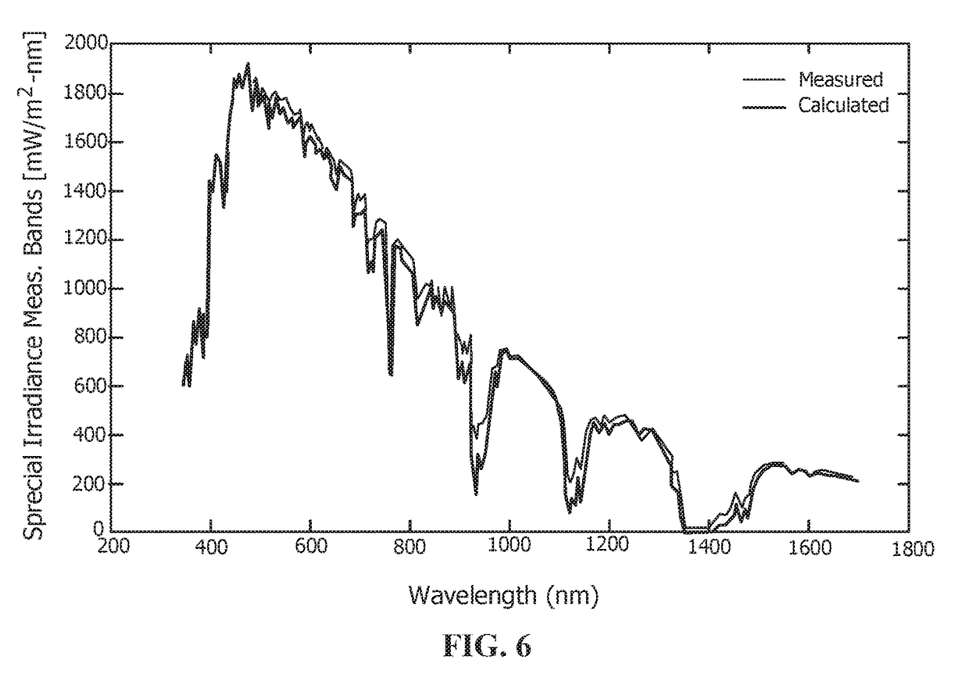
FIG. 6 shows the reconstructed spectrum from the Spectral Transmission Model provides a close correspondence with the full-band measured spectrum.
Figure 7:
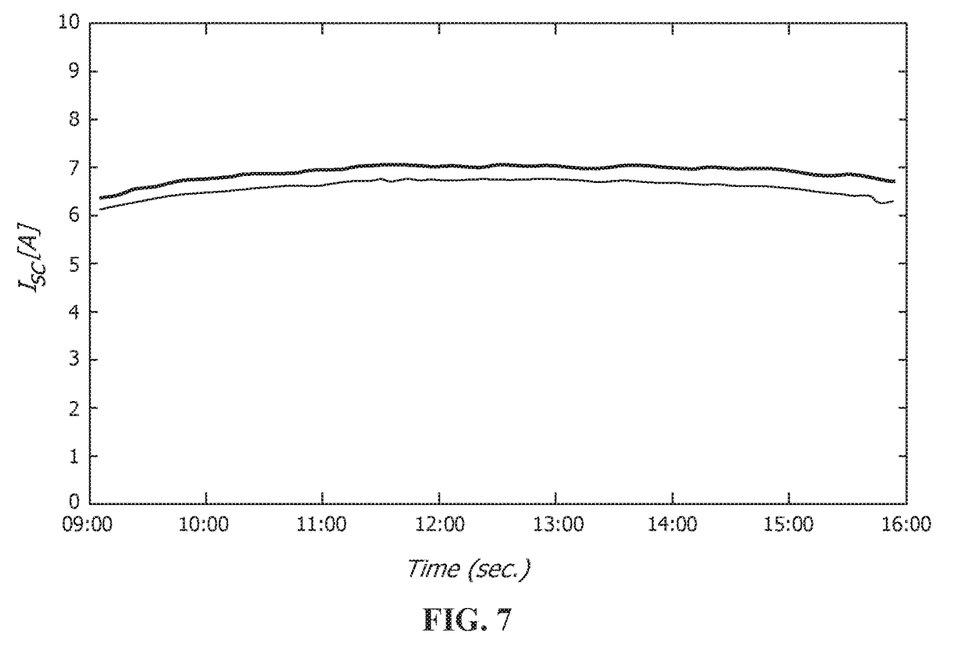
FIG. 7 shows a comparison of short circuit current between the EKO spectrometer and the measured photodiode data with spectral reconstruction using the Spectral Transmission Model of the present disclosure.

Referring to FIG. 6, based on data taken at solar noon on Oct. 1, 2014, the reconstructed spectrum from the Spectral Transmission Model provides a close correspondence with the full-band measured spectrum. Calculated spectrum shown on line 60 is based on discrete photodiode measurements and computation within the Sandia Spectral Transmission Model is compared with a measured full-band spectrum 65 from an EKO spectrometer for Oct. 1, 2014. Next, using this data with Eq. 4 one is able to compare the calculated short circuit current. Referring next to FIG. 7, the results of a comparison of short circuit current between the EKO spectrometer, indicated at line 70, and the measured photodiode data with spectral reconstruction using the Spectral Transmission Model indicated at line 75, for Oct. 1, 2014 shows close agreement to within a low RMS error of 0.05.

Figure 8:
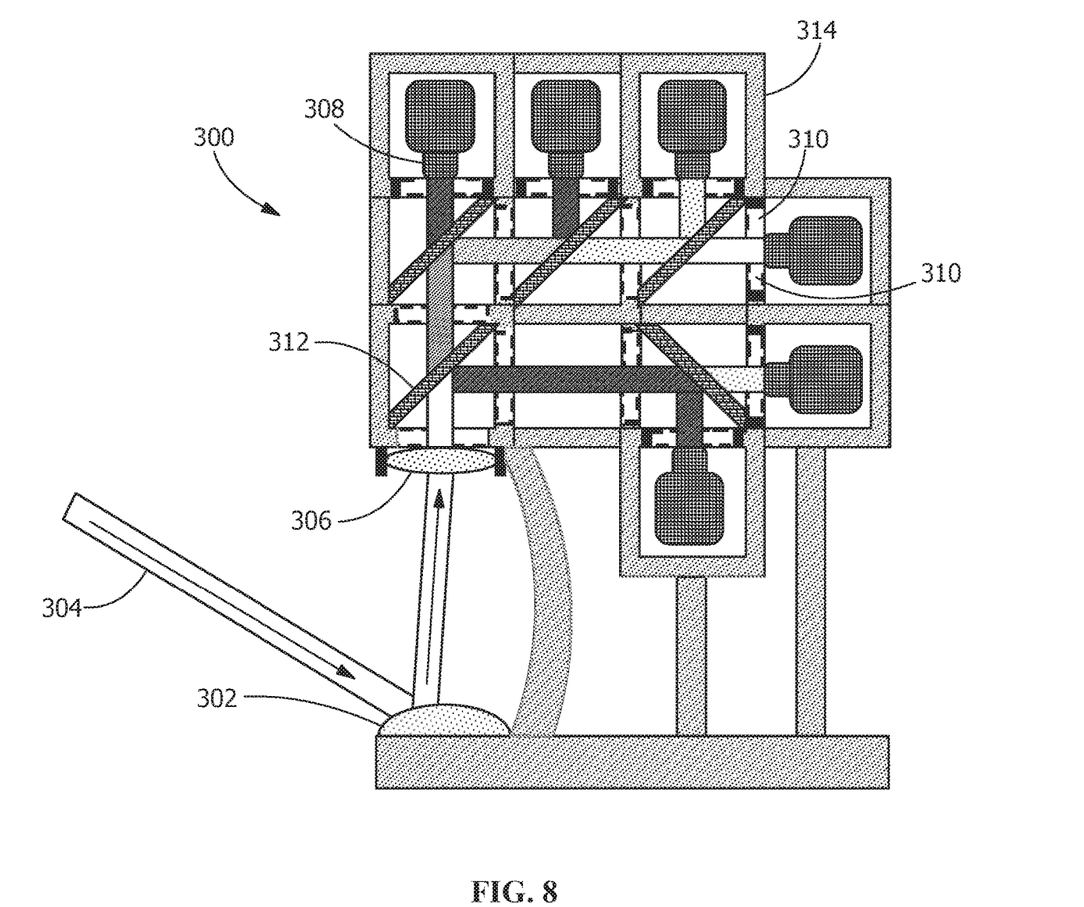
FIG. 8 shows an alternate embodiment of a non-tracking solar sensor system.

Referring next to FIG. 8, an alternate embodiment of a non-tracking solar sensor system 300 is shown. The non-tracking solar sensor system 300 includes a convex reflective mirror 302 for receiving incident white light 304, and reflecting the light 304 at an optical collimation lens 306. Collimating lens 306 directs collimated light rays at an array 314 of optical sensors 308 and filters 310. In the embodiment of FIG. 8, hemispherical reflective mirror 302 is shown placed at the bottom of system 300 to direct light 304 upwards into the detector array 314. Optical wavelength separation may be accomplished using dichroic mirrors 312. Dichroic mirrors 312 may be placed to selectively reflect predetermined portions of the solar spectrum while passing others. The ratios of signals between sensors may be used to describe the overall solar spectrum.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the low-cost spectral sensor and analyzer, as shown in the various exemplary embodiments is illustrative only.

Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A non-tracking solar sensor system, comprising:
a housing;
a lens disposed at one end of the housing for collecting solar irradiance;
a grating that disperses light into different spectral orders;
a collimating lens disposed between the lens and the grating;
a linear detector array disposed at an opposite end of the housing; and
a focusing lens disposed between the grating and the linear detector array;
wherein the linear detector array comprises:
a first photodiode sensor disposed within the housing portion, a filter wheel positioned intermediate the first photodiode sensor, the first photodiode sensor arranged to receive filtered light; and
a second photodiode sensor disposed on an exterior of the housing and arranged to sense an unfiltered light.

2. The system of claim 1, further comprising:
a data acquisition module for receiving data from the linear detector array.

3. The system of claim 1, wherein the focusing lens focusses dispersed light onto the linear detector array.

4. The system of claim 1, further comprising:
a computer system that receives digital data from the data acquisition module for processing.

* * * * *